April 29, 1930.  J. C. MOODY  1,756,566
COOLING FLUID CONTROL VALVE
Filed March 1, 1928
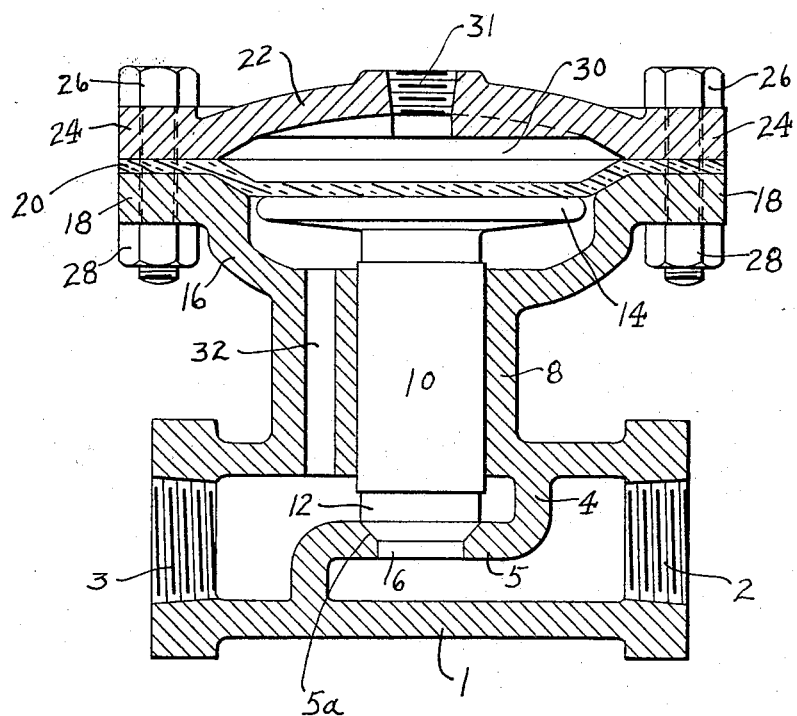
INVENTOR.
Julius C. Moody
BY
Ira L. Nickerson
ATTORNEY.

Patented Apr. 29, 1930

1,756,566

UNITED STATES PATENT OFFICE

JULIUS C. MOODY, OF FRANKLIN, PENNSYLVANIA, ASSIGNOR TO CHICAGO PNEUMATIC TOOL COMPANY, OF NEW YORK, N. Y., A CORPORATION OF NEW JERSEY

COOLING-FLUID-CONTROL VALVE

Application filed March 1, 1928. Serial No. 258,214.

The present invention relates to fluid control valves adapted and intended for use in regulating the flow of water in engine cooling systems. More particularly it relates to air or gas compressing outfits in which such a valve is operated or controlled through the air pressure such as disclosed in Hoff-.., et al. Patent No. 1,438,044, issued February 5, 1924.

One object of the invention is to provide an improved form of valve for use in the water cooling system of an air compressor. Another object is to reduce the number of parts in such valves thereby to render the valve more reliable in operation and less likely to fail in service. Another object is to reduce both the initial cost and the repair expense for such valves. Other objects will be apparent from the detailed description which follows:

The invention provides a fluid control valve of extreme simplicity and reliability, containing by preference only two moving parts, namely a valve plunger of ample size, and suitable means, such as a diaphragm, for moving the valve in one direction under the fluid pressure developed by the outfit. The pressure of the cooling fluid controlled by the valve is the only force utilized to move the valve against the pressure on the diaphragm. By preference the area of the valve subjected to the pressure of the cooling fluid is very much less than the area engaged by the diaphragm.

In order to illustrate the invention one concrete embodiment thereof is shown in the accompanying drawing, the single view of which shows the valve in vertical section.

In the drawing the valve structure comprises a conduit 1 which at one end has an inlet 2 and at the other end an outlet 3. Extending across said conduit 1 and completely dividing the inlet side thereof from the outlet side is a wall or a partition 4 which has a portion 5 lying parallel with the length of said conduit 1 and positioned centrally between the side walls thereof. Through said portion 5 of said wall 4 there is formed a passageway 6 which, in the open position of the valve, connects the inlet and the outlet sides of said conduit 1. Extending at right angles from the wall of said conduit 1 and directly over said passageway 6 is a cylinder 8 having a central bore in which the plunger 10 is mounted for longitudinal movement. Said plunger 10, at one end, carries a valve closure element 12 which is in operative relation to said passageway 6, and cooperates with a tapered valve seat 5ª in wall 5. At its opposite end said plunger 10 is flanged radially to form an enlarged head 14 which is spaced from the end of said cylinder 8. From said cylinder 8 there extends a casing wall 16 which projects outwardly and upwardly beyond the limits of said head 14 and terminates in an annular flange 18. A flexible diaphragm 20 of rubber, leather, impregnated canvas, metal, or other suitable material, extends across the upper limits of said casing wall 16 to form a complete closure over said flange 18. Over said diaphragm 20 is positioned a concavely arched cover 22 having an annular flange 24. Bolts 26, passing through said flange 24, circumferential portions of said diaphragm 20, and said flange 18, serve when tightened by the nuts 28, 28, to securely clamp said diaphragm 20 between said flange 18 and said flange 24. As shown said diaphragm 20 has a circular concavity facing the concavity of said cover wall 22, whereby there is provided between said diaphragm 20 and said cover wall 22 a diaphragm chamber 30, which permits lateral movement of the central portion of said diaphragm 20. The dimensions of said chamber 30 and of said diaphragm 20 and the flexibility of the latter are so provided that said valve closure 12 can be moved from seat 5ª to open passageway 6 and also to provide that when said valve closure 12 is in closing abutment against seat 5ª to close said passageway 6 said diaphragm 20 in its lateral movement or flexure can be in tight engagement against said head 14. Cover 20 has a threaded part 31 and cylinder 8 has a passage 32 in substantial parallelism with plunger 10 connecting the outlet end of said conduit 1 with the space beneath diaphragm 20.

In the use and operation of the invention, inlet 2 is connected to a source of cooling water under pressure and outlet 3 to the water cooling jacket (not shown) of the air compressor or other engine. Diaphragm chamber 30 is connected through opening 31 to the delivery line or receiver of the air compressor (not shown). The end areas of plunger 10 subjected to the opposing pressures of air and water are differential in size as indicated and are so proportioned that when the predetermined pressure, necessary to unload the compressor is secured, plunger 10 will be forced downwardly to close opening 6 in partition 4. The tapering of the valve and of the seat are to be noted since less air pressure is required to hold the valve on its seat than to close it due to the restriction of the effective area than subjected to the water pressure. Thus the air pressure can drop the required amount to "load" the compressor before the water pressure is sufficient to overcome the reduced air pressure on the large head 14. For closing the valve the air pressure must build up to a much higher pressure than is necessary to hold the valve to its seat after it has closed.

From the above it will be apparent that the present invention provides a water control valve in which the number of parts is reduced to a minimum and in which the parts are exceptionally rugged in construction. Moreover there are no springs, no check valves or other small parts which are subject to wear and failure or are easily deranged or impaired by sediment or corrosion, since the opposing fluid pressures alone are relied upon for moving the valves.

I claim as my invention:

1. A valve structure for regulating the cooling fluid in a gas compressing system comprising a casing providing a chamber forming a conduit for said fluid, a valve for controlling said conduit, and means whereby movement of said valve is controlled solely by the pressure of said cooling fluid and of said gas.

2. A valve structure for regulating the cooling fluid in a gas compressing system comprising a casing providing a chamber forming a conduit for said fluid, a plunger providing a valve for controlling said conduit, said plunger having differential areas, and means subjecting said areas respectively to the pressures exerted by said cooling fluid and by said compressed gas as the sole means for controlling the movement of said plunger.

3. A valve structure for regulating the cooling fluid in a gas compressing system comprising a casing providing spaced chambers, one of said chambers forming a conduit for said fluid, the other chamber having compressed gas admitted thereto, a plunger extending into both said chambers and controlling said conduit, and means subjecting the opposite ends of said plunger to the pressure of said fluid and of said compressed gas whereby its movement is controlled solely by variations in such pressures.

4. A valve structure for regulating the cooling fluid in a gas compressing system comprising a casing providing spaced chambers, one of said chambers forming a conduit for said fluid, a diaphragm extending transversely of said other chamber, means subjecting one face of said diaphragm to the pressure of said compressed gas, a plunger for controlling said conduit having one end in engagement with said diaphragm and the other end directly subjected to the pressure of said cooling fluid, said plunger being arranged to be moved solely by the variations in the pressures of said cooling fluid and of said compressed gas.

5. A valve structure for regulating the cooling fluid in a gas compressing system comprising a casing providing spaced chambers, one of said chambers forming a conduit for said fluid, a diaphragm extending transversely of said other chamber, means for conducting said compressed gas to said diaphragm chamber to apply its pressure to one face of said diaphragm, a plunger for controlling said conduit having one end forming a valve for controlling said conduit and directly subjected to the pressure of said cooling fluid and having an enlarged head engaging the other face of said diaphragm, said plunger being moved solely by the variations in the pressures exerted by said cooling fluid and by said compressed gas.

6. A valve structure for a water regulating apparatus in an air-compressor cooling system, comprising in operable relation, a valve body having a passageway for water therethrough with an inlet side and an outlet side, a closure member between said inlet side and said outlet side movable in one direction to close said passageway and movable in an opposite direction to open said passageway, said member being adapted to be moved solely by water pressure from said inlet side to open said passageway, an extension from said closure projecting through the wall of said passageway and a flanged head carried thereby, said body providing a closed chamber about the outer end of said extension and about said head, a diaphragm in said chamber in operable relation to said head and adapted to be flexed thereagainst to move said extension to actuate said closure to close said passageway, a second closed chamber having the other side of said diaphragm as one of its walls and arranged to be connected to the delivery line of said compressor and a connecting passageway between first said chamber and the outlet end of said first passageway.

7. A valve structure for a water regulating apparatus in an air-compressor cooling system, comprising in operable relation, a valve body having a passageway for water therethrough with an inlet side and an outlet side, a valve member of tapered form for cooperation with a tapered seat in said passageway, said member being arranged to be moved solely by water pressure from said inlet side to open said passageway, an extension on said member projecting through the wall of said passageway and provided with an enlarged head, said body providing a chamber about the outer end of said extension and about said head, a diaphragm in said chamber in operable relation to said head and adapted to be flexed thereagainst by air pressure built up by said compressor for moving said head to actuate said closure to close said passageway, said body providing an open passage connecting the under side of said diaphragm to the outlet end of said first passageway.

8. A valve structure for regulating the cooling fluid in a gas compressing system comprising a casing providing a chamber forming a conduit for said fluid, a partition in said chamber having an opening therethrough and providing a tapered valve seat, a tapered valve cooperating with said seat for controlling said conduit and presenting an area to the pressure of the cooling fluid, said valve having a second area of greater extent, and means subjecting said second area of said valve to the pressure of a compressed gas thereby automatically to control the position of said valve by the relative pressures of said cooling fluid and of said compressed gas.

9. A valve structure for regulating the cooling fluid in a gas compressing system comprising a casing providing a chamber forming a conduit for said fluid, a partition in said chamber having an opening therethrough and providing a tapered valve seat, a tapered valve cooperating with said seat for controlling said conduit and presenting an area to the pressure of the cooling fluid, said valve having a head, a diaphragm for engagement with said head, and connections whereby the opposite sides of said diaphragm are subjected to the pressures of the compressed gas and of the cooling fluid respectively whereby the position of said valve is controlled solely by the relative pressures of said fluid and said gas.

Signed by me at Franklin, county of Venango, State of Pennsylvania this 27th day of February, 1928.

JULIUS C. MOODY.

CERTIFICATE OF CORRECTION.

Patent No. 1,756,566. Granted April 29, 1930, to

JULIUS C. MOODY.

It is hereby certified that error appears in the printed specification of the above numbered patent requiring correction as follows: Page 1, line 8, for Patent No. "1,438,044" read "1,483,044"; page 2, line 17, for "than" read "then"; and that the said Letters Patent should be read with these corrections therein that the same may conform to the record of the case in the Patent Office.

Signed and sealed this 13th day of May, A. D. 1930.

(Seal)

M. J. Moore,
Acting Commissioner of Patents.